US012693447B2

(12) United States Patent
Dow et al.

(10) Patent No.: US 12,693,447 B2
(45) Date of Patent: Jul. 28, 2026

(54) GENERATING INPUT DATA FOR SIMULATING RESERVOIRS WITH VARIABLE FLUID CONTACT DEPTHS

(71) Applicant: Saudi Arabian Oil Company, Dhahran (SA)

(72) Inventors: Eric A. Dow, Cambridge, MA (US); Michael L. Szulczewski, Cambridge, MA (US)

(73) Assignee: Saudi Arabian Oil Company, Dhahran (SA)

( * ) Notice: Subject to any disclaimer, the term of this patent is extended or adjusted under 35 U.S.C. 154(b) by 1175 days.

(21) Appl. No.: 17/499,430

(22) Filed: Oct. 12, 2021

(65) Prior Publication Data

US 2023/0112695 A1 Apr. 13, 2023

(51) Int. Cl.
| | |
|---|---|
| *G06F 30/20* | (2020.01) |
| *G01V 20/00* | (2024.01) |
| G06F 111/04 | (2020.01) |
| G06F 111/10 | (2020.01) |
| G06F 113/08 | (2020.01) |

(52) U.S. Cl.
CPC .............. *G01V 20/00* (2024.01); *G06F 30/20* (2020.01); *G06F 2111/04* (2020.01); *G06F 2111/10* (2020.01); *G06F 2113/08* (2020.01)

(58) Field of Classification Search
CPC ..... G01V 20/00; G06F 30/20; G06F 2111/04; G06F 2113/08; G06F 2111/10
See application file for complete search history.

(56) References Cited

U.S. PATENT DOCUMENTS

| | | | |
|---|---|---|---|
| 8,073,663 B2 | 12/2011 | Carruthers et al. | |
| 8,078,439 B2 | 12/2011 | Srnka et al. | |

(Continued)

FOREIGN PATENT DOCUMENTS

WO    WO 2019168928    9/2019

OTHER PUBLICATIONS

N. C. Chithra Chakra, D. N. Saraf, "History matching of petroleum reservoirs employing adaptive genetic algorithm", pp. 653-674, 2015 (Year: 2015).*

(Continued)

*Primary Examiner* — Kibrom K Gebresilassie
(74) *Attorney, Agent, or Firm* — Fish & Richardson P.C.

(57) ABSTRACT

Methods and systems, including computer programs encoded on a computer storage medium are described for generating data used to simulate properties of a target area in a subterranean region. A system obtains data describing a water-hydrocarbon interface of the target area and selects control parameters for processing the data based on a formation mechanism corresponding to a pressure or temperature of the target area. An objective function is determined that measures a delta between first values observed in the data and second values from simulations of the target area. Based on outputs of the function, the system calculates values for the control parameters that minimizes the delta between the first values observed in the data and the second values from simulations of the target area. The input data is generated to simulate properties of the target area based on calculated values of the control parameters.

17 Claims, 10 Drawing Sheets
(6 of 10 Drawing Sheet(s) Filed in Color)

300

OBTAIN INTERFACE DATA DESCRIBING A WATER-HYDROCARBON INTERFACE OF A TARGET AREA
302

SELECT CONTROL PARAMETERS FOR PROCESSING THE INTERFACE DATA, BASED ON A FORMATION MECHANISM INVOLVED IN GENERATING THE WATER-HYDROCARBON INTERFACE
304

DETERMINE AN OBJECTIVE FUNCTION THAT MEASURES A DELTA BETWEEN FIRST VALUES OBSERVED IN THE INTERFACE DATA AND SECOND VALUES FROM SIMULATIONS OF THE TARGET AREA
306

BASED ON AN OUTPUT OF THE OBJECTIVE FUNCTION, CALCULATE VALUES FOR EACH OF THE CONTROL PARAMETERS THAT MINIMIZES THE DELTA BETWEEN THE FIRST VALUES OBSERVED IN THE DATA AND THE SECOND VALUES FROM SIMULATIONS OF THE TARGET AREA
308

GENERATE INPUT DATA TO SIMULATE PROPERTIES OF THE TARGET AREA BASED ON THE VALUES FOR EACH OF THE CONTROL PARAMETERS THAT MINIMIZES THE DELTA BETWEEN THE FIRST VALUES OBSERVED IN THE DATA AND THE SECOND VALUES FROM SIMULATIONS OF THE TARGET AREA
310

(56) References Cited

U.S. PATENT DOCUMENTS

| | | | |
|---|---|---|---|
| 8,335,677 B2 * | 12/2012 | Yeten | E21B 43/00 |
| | | | 703/10 |
| 9,020,793 B2 | 4/2015 | Kumar et al. | |
| 10,393,923 B2 | 8/2019 | Ahn et al. | |
| 11,073,637 B2 | 7/2021 | Dow et al. | |
| 11,105,957 B2 | 8/2021 | Conn et al. | |
| 11,126,762 B2 * | 9/2021 | Dogru | E21B 47/107 |
| 2009/0006054 A1 * | 1/2009 | Song | G01V 1/282 |
| | | | 703/6 |
| 2009/0037114 A1 | 2/2009 | Peng et al. | |
| 2010/0223039 A1 | 9/2010 | Maliassov | |
| 2011/0054859 A1 * | 3/2011 | Ding | E21B 43/20 |
| | | | 703/2 |
| 2012/0029895 A1 | 2/2012 | Xi | |
| 2012/0136636 A1 | 5/2012 | Kleine | |
| 2013/0064040 A1 | 3/2013 | Imhof et al. | |
| 2013/0158877 A1 | 6/2013 | Bakke et al. | |
| 2013/0218538 A1 | 8/2013 | Fuecker et al. | |
| 2014/0188865 A1 | 7/2014 | Karatzoglou et al. | |
| 2014/0233352 A1 | 8/2014 | Kacewicz et al. | |
| 2014/0278298 A1 | 9/2014 | Maerten | |
| 2014/0358502 A1 | 12/2014 | Kleine | |
| 2015/0081265 A1 | 3/2015 | Kauerauf et al. | |
| 2015/0127313 A1 | 5/2015 | Lawson et al. | |
| 2015/0142407 A1 | 5/2015 | Wakefield et al. | |
| 2016/0145977 A1 | 5/2016 | Chugunov et al. | |
| 2016/0298427 A1 | 10/2016 | Kauerauf et al. | |
| 2016/0363691 A1 | 12/2016 | Hu et al. | |
| 2018/0371875 A1 | 12/2018 | Kayun | |
| 2019/0146119 A1 | 5/2019 | Vogt et al. | |
| 2019/0196059 A1 | 6/2019 | Ducros et al. | |
| 2019/0196060 A1 | 6/2019 | Ducros | |
| 2019/0228121 A1 | 7/2019 | Fung et al. | |
| 2019/0293835 A1 | 9/2019 | Kauerauf | |
| 2019/0302289 A1 | 10/2019 | Song | |
| 2019/0302290 A1 | 10/2019 | Alwon | |
| 2020/0088897 A1 | 3/2020 | Roy | |

OTHER PUBLICATIONS

PCT International Search Report and Written Opinion in International Appln. No. PCT/US2022/046466, dated Jan. 23, 2023, 15 pages.

Davolio et al., "A methodology to calibrate water saturation estimated from 4D seismic data," Journal of Geophysics and Engineering, Institute of Physics and Publishing, Bristol, GB, Sep. 2014, 14 pages.

Al-Sudani, "Analytical Model for Detection the Tilt in Originally Oil Water Contacts" Iraqi Journal of Chemical and Petroleum Engineering, 15(3), Sep. 2014, 15(3), 51-60, 11 pages.

Bahrami et al., "A Binomial Heap Algorithm for Self-Recognition in Exclusive Management on Autonomic Grid Networks," IEEE, 2010, 326-329, 4 pages.

Chakra et al., "History matching of petroleum reservoirs employing adaptive genetic algorithm" J. Petrol. Explor. Prod. Technol, 6, Dec. 2015, 653-674, 22 pages.

Coats et al., "The Use of Vertical Equilibrium in Two-Dimensional Simulation of Three-Dimensional Reservoir Performance" Society of Petroleum Engineers Journal, 11(1), Mar. 1971, 68-71, 9 pages.

Computer Modelling Group Ltd. 2014. IMEX User Guide: Three-Phase, Black-Oil Reservoir Simulator, Version 2014, 2 pages.

Dennis et al., "Tilted oil-water contacts: modelling the effects of aquifer heterogeneity" Geological Society, London, Petroleum Geology Conference series, 6(1), Jan. 2005, 145-158, 14 pages.

Ejeh et al., "Effect of hydrodynamic tilting at fluid contacts to reservoir production performance" Results in Engineering, 8:100184, Dec. 2020, 12 pages.

Ferrero et al., "Predicting water in the crest of a giant gas field: Ormen Lange hydrodynamic aquifer model" In SPE Europec/ EAGE Annual Conference, Society of Petroleum Engineers, Jan. 2012, 13 pages.

Gao et al., "Different Methods of Modeling Tilted Free Water Levels and the Impact on Field Production" SPE Reservoir Characterisation and Simulation Conference and Exhibition, Abu Dhabi, UAE, Sep. 14-16, 2015, 11 pages.

Hantschel and Kauerauf, "Fundamentals of basin and petroleum systems modeling: 6.8 Invasion Percolation," Springer Science & Business Media, Apr. 9, 2009, 31 pages.

Hantschel et al., "Fundamentals of Basin and Petroleum Systems Modeling," Springer-Verlag Berlin Heidelberg, 2009, 490 pages.

Hsueh et al., "A review of different methods in initializing and history matching a reservoir model with tilted oil-water-contact" 1999 SPE Middle East Oil Show, Bahrain, Feb. 20-23, 1999, 16 pages.

Hubbert, "Entrapment of petroleum under hydrodynamic conditions" AAPG Bulletin, 37(8), Aug. 1953, 1954-2026, 73 pages.

Lie, "An Introduction to Reservoir Simulation Using MATLAB/ GNU Octave" User Guide for the MATLAB Reservoir Simulation Toolbox (MRST). Cambridge University Press, 2019, 680 pages.

Mamedov et al., "New Approach for Oil and Gas Reservoir Simulation With Tilted Fluid Contacts" SPE Russian Petroleum Technology Conference and Exhibition, Moscow, Russia, Oct. 24-26, 2016, 16 pages.

Masson et al., "A fast algorithm for invasion percolation," Transport in porous media 102.2, Springer Verlag, Feb. 2014, 13 pages.

Masson, "A fast two-step algorithm for invasion percolation with trapping," Computers & Geosciences 90, Part A, May 2016, 9 pages.

Stenger, "Regional temperature gradient: a key to tilted OOWC" Middle East Oil Show and Conference, Bahrain, Feb. 20-23, 1999, 15 pages.

Steven G. Johnson, "The NLopt nonlinear-optimization package" Sep. 2020, [retrieved on Oct. 21, 2021], retrieved from: URL <http://github.com/stevengj/nlopt>, 3 pages.

Sykes, "Simulation of a Hydrodynamic Aquifer in the ACG Field" Azerbaijan, MSc Thesis, Imperial College London, Sep. 2014, 49 pages.

Vadicharla et al., "Optimization Techniques for History Matching and Production Forecasting" Int. Journal of Recent Technology and Engineering, 8(4):1, Nov. 2019, 106-116, 11 pages.

Wang et al., "A Review of Formation Mechanism Study on Reservoirs with Tilted Oil-water Contacts" Acta Geologica Sinica-English Edition, 91(1), Mar. 2017, 320-340, 21 pages.

Wangen et al., "Simple 3-D Modeling of Hydrocarbon Migration," AAPG/Datapages Discovery Series, 2003, 243-253, 11 pages.

* cited by examiner

300

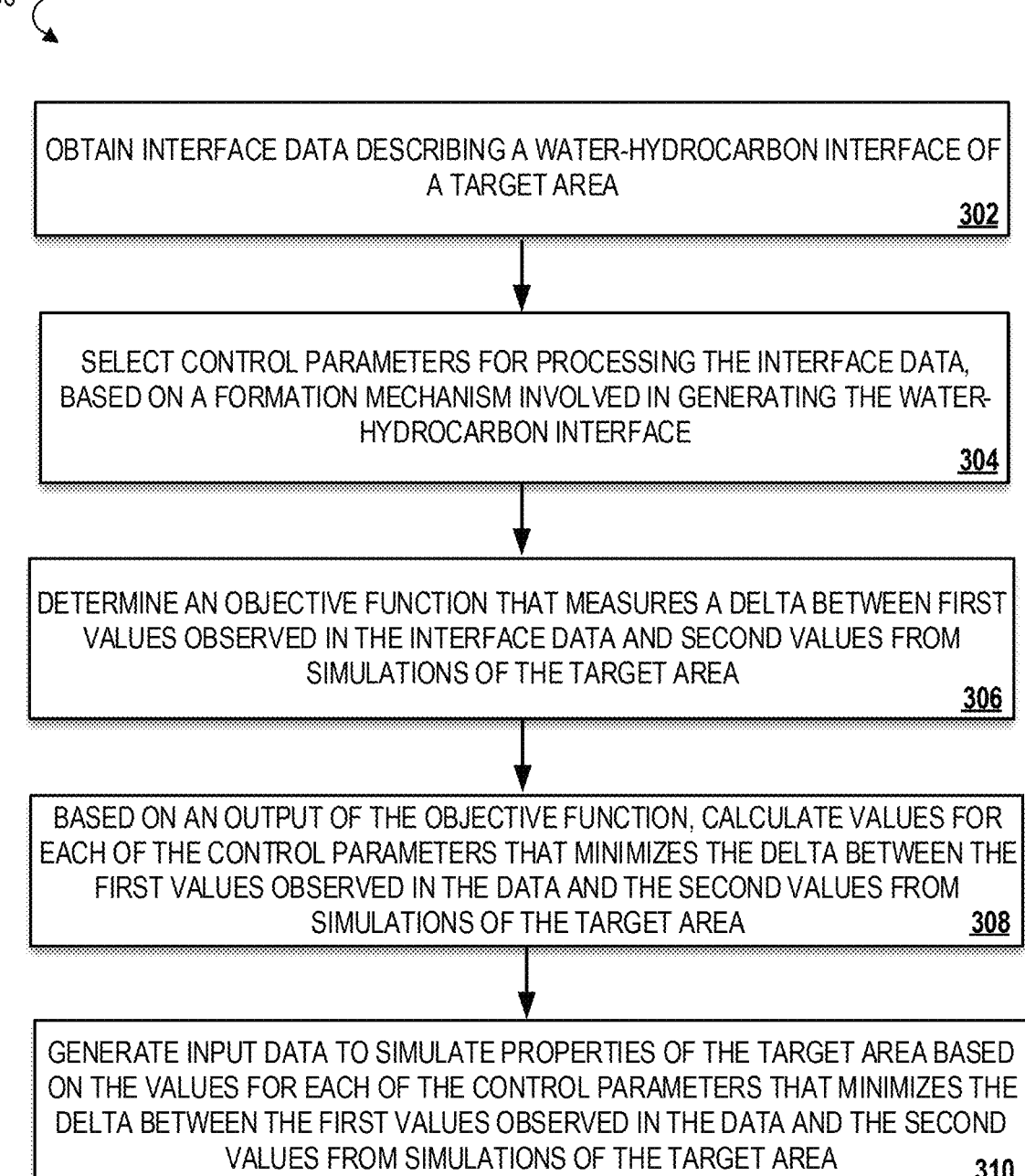

OBTAIN INTERFACE DATA DESCRIBING A WATER-HYDROCARBON INTERFACE OF A TARGET AREA                                                                    302

SELECT CONTROL PARAMETERS FOR PROCESSING THE INTERFACE DATA, BASED ON A FORMATION MECHANISM INVOLVED IN GENERATING THE WATER-HYDROCARBON INTERFACE                                                                         304

DETERMINE AN OBJECTIVE FUNCTION THAT MEASURES A DELTA BETWEEN FIRST VALUES OBSERVED IN THE INTERFACE DATA AND SECOND VALUES FROM SIMULATIONS OF THE TARGET AREA                                                        306

BASED ON AN OUTPUT OF THE OBJECTIVE FUNCTION, CALCULATE VALUES FOR EACH OF THE CONTROL PARAMETERS THAT MINIMIZES THE DELTA BETWEEN THE FIRST VALUES OBSERVED IN THE DATA AND THE SECOND VALUES FROM SIMULATIONS OF THE TARGET AREA          308

GENERATE INPUT DATA TO SIMULATE PROPERTIES OF THE TARGET AREA BASED ON THE VALUES FOR EACH OF THE CONTROL PARAMETERS THAT MINIMIZES THE DELTA BETWEEN THE FIRST VALUES OBSERVED IN THE DATA AND THE SECOND VALUES FROM SIMULATIONS OF THE TARGET AREA          310

Fig. 3

GENERATING INPUT DATA FOR SIMULATING RESERVOIRS WITH VARIABLE FLUID CONTACT DEPTHS

TECHNICAL FIELD

This specification relates to generating data for simulations of subsurface formations.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis is a subdivision of seismic stratigraphy and plays an important role in hydrocarbon exploration and is one key step in the interpretation of seismic data for reservoir characterization and generation of geological maps. The seismic facies in a given geological area can provide useful information, particularly about the types of sedimentary deposits and the anticipated lithology.

In reflection seismology, geologists and geophysicists perform seismic surveys and other field activities (e.g., drilling and logging test wells) to map and interpret sedimentary facies and other geologic features for applications such as identification of potential petroleum reservoirs. Seismic surveys are conducted by using a controlled seismic source (for example, a seismic vibrator or dynamite) to create a seismic wave. In land-based seismic surveys, the seismic source is typically located at ground surface. The seismic wave travels into the ground, is reflected by subsurface formations, and returns to the surface where it is recorded by sensors called geophones.

Hydrocarbon reservoirs can include an interface between water and hydrocarbons that exhibit spatially varying depths prior to production. If the interface is at steady state, computer simulations of hydrocarbon recovery from these reservoirs pose a problem. For example, the simulations require appropriate input data to reproduce the topology of the interface, but the data is often unavailable, incomplete, erroneous, or inconsistent with the observed interface. In these cases, new data can be obtained via field measurements or inferred from information about the interface. Existing methods for inferring data required to simulate tilted water-hydrocarbon interfaces can include trial-and-error methods and simplified modeling methods.

SUMMARY

This disclosure describes an automated method to infer input data required for simulations of hydrocarbon reservoirs in which the water-hydrocarbon interface exhibits steady-state, spatially varying depths prior to production. The method uses optimization and treats an appropriate subset of the input data as control parameters. It solves for the values of the control parameters that minimize the error between information about the observed interface and the simulated interface.

One aspect of the subject matter described in this specification can be embodied in a computer-implemented method for generating data used to simulate properties of a target area in a subterranean region. The method includes obtaining interface data describing a water-hydrocarbon interface of the target area and selecting control parameters for processing the interface data, based on a formation mechanism involved in generating the water-hydrocarbon interface. The method further includes determining an objective function that measures a delta between first values observed in the interface data and second values from simulations of the target area and, based on an output of the objective function, calculating values for each of the control parameters that minimizes the delta between the first values observed in the interface data and the second values from simulations of the target area. The method further includes and generating input data to simulate properties of the target area based on the values for each of the control parameters that minimizes the delta between the first values observed in the interface data and the second values from simulations of the target area.

These and other implementations can each optionally include one or more of the following features. For example, in some implementations, calculating values for each of the control parameters includes: identifying an equation that constrains data optimization to a steady-state of the target area; determining a respective value for a boundary condition and an initial condition of the target area; and solving the equation using the respective values for the boundary condition and initial condition. The can method include: performing inference computations to obtain a dataset for a steady-state simulation, wherein the dataset includes delta measurements of the objective function; and based on the delta measurements, performing iterative optimization to minimize a delta between a first value observed in the interface data and a second value from the particular simulation of the target area.

In some implementations, calculating values for each of the control parameters includes: calculating values for each of the control parameters that produce a particular simulation result corresponding to a smallest delta between observed interface data and simulated data, based on the iterative optimization. In some implementations, the method includes: regularizing the data based on a type of input data to be generated; and selecting one or more of the control parameters based on regularized data.

Selecting the control parameters can include: determining formation mechanisms that affect a topology of the water-hydrocarbon interface; selecting, from the formation mechanisms, a set of formation mechanisms to model properties of the water-hydrocarbon interface; and selecting the control parameters based on the set of mechanisms.

In some implementations, the set of formation mechanisms includes one or more of: spatially varying capillarities, spatially varying hydrodynamic pressures, spatially varying fluid densities; and spatially varying temperatures. The control parameters can correspond to one or more of: capillary pressure curves, pressure-related boundary conditions of the target area, and temperature-related boundary conditions of the target area. In some implementations, the water-hydrocarbon interface has a spatially varying depth. In some other implementations, the water-hydrocarbon interface has a spatially varying depth at steady-state.

The target area in the subterranean region can be a hydrocarbon reservoir; and the interface data describes a topology of the water-hydrocarbon interface prior to injection of fluids from the hydrocarbon reservoir or production of fluids from the hydrocarbon reservoir.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented to realize one or more of the following advantages. Relative to the simplified modeling approach, the disclosed technique is advantageous because it can incorporate the physical processes (e.g., all processes) an engineer uses for reservoir simulations, including some (or all) of the heterogeneous and anisotropic reservoir properties. As a result, the data inferred from this technique can produce less error between the observed water-hydrocarbon interface and the interface that is simulated with the inferred data. Additionally, unlike the trial-and-error method, the disclosed technique is advantageous because it can be automated and employed via a simulator, which streamlines the estimation process, provides for improvements in the accuracy of the data results, and provides for increases in the speed generating the data results. Relatedly, the simulator can incorporate certain analytical optimizations that cause data inferred from this technique to produce fewer errors between the observed water-hydrocarbon contact and the simulation results.

The details of one or more embodiments of these systems and methods are set forth in the accompanying drawings and the following description. Other features, objects, and advantages of these systems and methods will be apparent from the description and drawings, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 shows an example process for generating data used to simulate properties of a target area in a subterranean region.

Like reference numbers and designations in the various drawings indicate like elements.

DETAILED DESCRIPTION

Accurate input data for use in simulating geological properties of subsurface formations can be important tools for use in oil and gas exploration. For example, the geological maps based on resources such as data simulations and modeling are used for estimating hydrocarbon resources in a subsurface area such as a reservoir. The information provided by these resources can be used to make decisions about drilling locations, including allocation and expenditure of resources for hydrocarbon exploration. The geological properties can be specific to water-hydrocarbon interfaces that exhibit steady-state or spatially varying depths.

This specification describes systems and techniques for an improved approach to inferring and generating the required input data for use in simulating geological properties of subsurface formations. The disclosed techniques provide an automated method to infer input data required for simulations of hydrocarbon reservoirs in which the water-hydrocarbon interface exhibits steady-state, spatially varying depths prior to production. The techniques leverage optimization and use an appropriate subset of the input data as control parameters.

A system configured to implement this technology solves for values of the control parameters that minimize an error between information about the observed interface and the simulated interface. For example, if the system detects that an interface is tilted due to lateral gradients of fluid pressure in the reservoir, it can determine selection of the control parameters to be the pressures at the reservoir boundaries which create the lateral pressure gradients. Methods employed by the system would solve for the boundary pressures that drive the interface to an orientation that most closely matches the observed interface.

Figure 1:
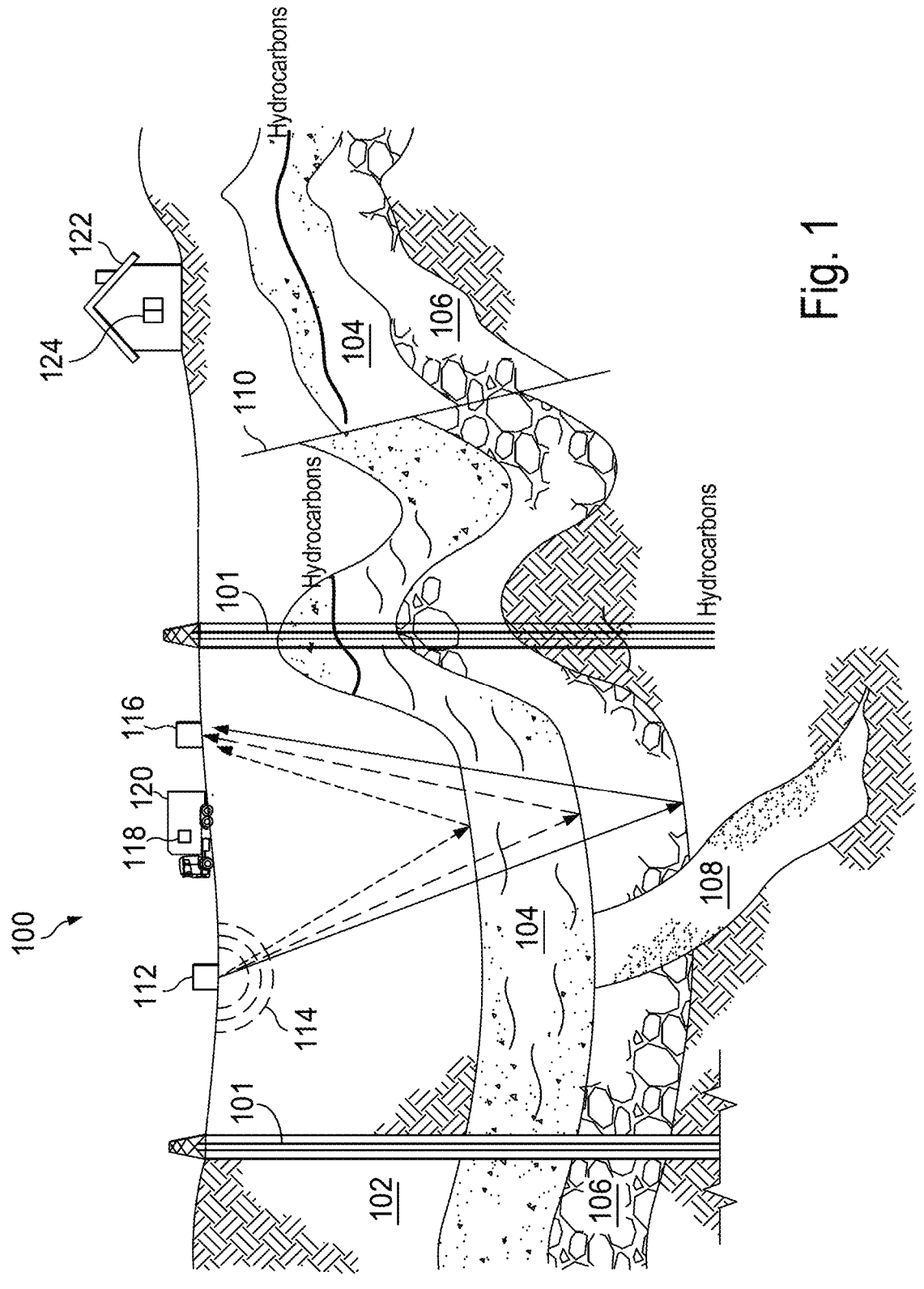
FIG. 1 is a schematic view of a seismic survey being performed to map subsurface features such as facies and faults.

FIG. 1 is a schematic view of a field activities (e.g., a seismic survey and logging test wells) being performed to map subterranean features such as facies and faults in a subterranean formation 100. The subterranean formation 100 includes a layer of impermeable cap rocks 102 at the surface. Facies underlying the impermeable cap rocks 102 include a layer 104, a layer 106, and a layer 108. A fault line 110 extends across the layer 104 and the layer 106. In the subterranean formation 100, the pores of layer 104 are saturated with fluid. Most of fluid is water but hydrocarbons floating on the water having been trapped under the impermeable cap rocks 102 at several locations. In this subterranean formation, the depth of the hydrocarbon-water interface varies across the formation.

A seismic source 112 (for example, a seismic vibrator or an explosion) generates seismic waves 114 that propagate in the earth. The velocity of these seismic waves depends on properties that include density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the layer 104, the layer 106, and the layer 108. As the seismic waves 114 contact interfaces between geologic bodies or layers that have different velocities, the interface reflects some of the energy of the seismic wave and refracts part of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, such as a seismic two-way response time plot.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems.

For example, test wells 101 have been drilled through the upper layers of the subterranean formation 100. Logging of the test wells and analysis of drill cuttings can provide confirmation of the presence and depth of various layers at an individual well site as well as information about the media forming specific layers of the subterranean formation and characterize fluid present in pores of the layers. Wells 101 drilled through the trapped hydrocarbons can provide information about the depth of the hydrocarbon-water interface.

For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location other than the control center 122. Some computer systems are provided with functionality for manipulating and analyzing the data, such as performing seismic interpretation or borehole resistivity image log interpretation, to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing the subterranean formation 100. The seismic cube can also display results of the analysis of the seismic data associated with the seismic survey. The results of the survey can be used to generate a geological model representing properties or characteristics of the subterranean formation 100.

Figure 2:
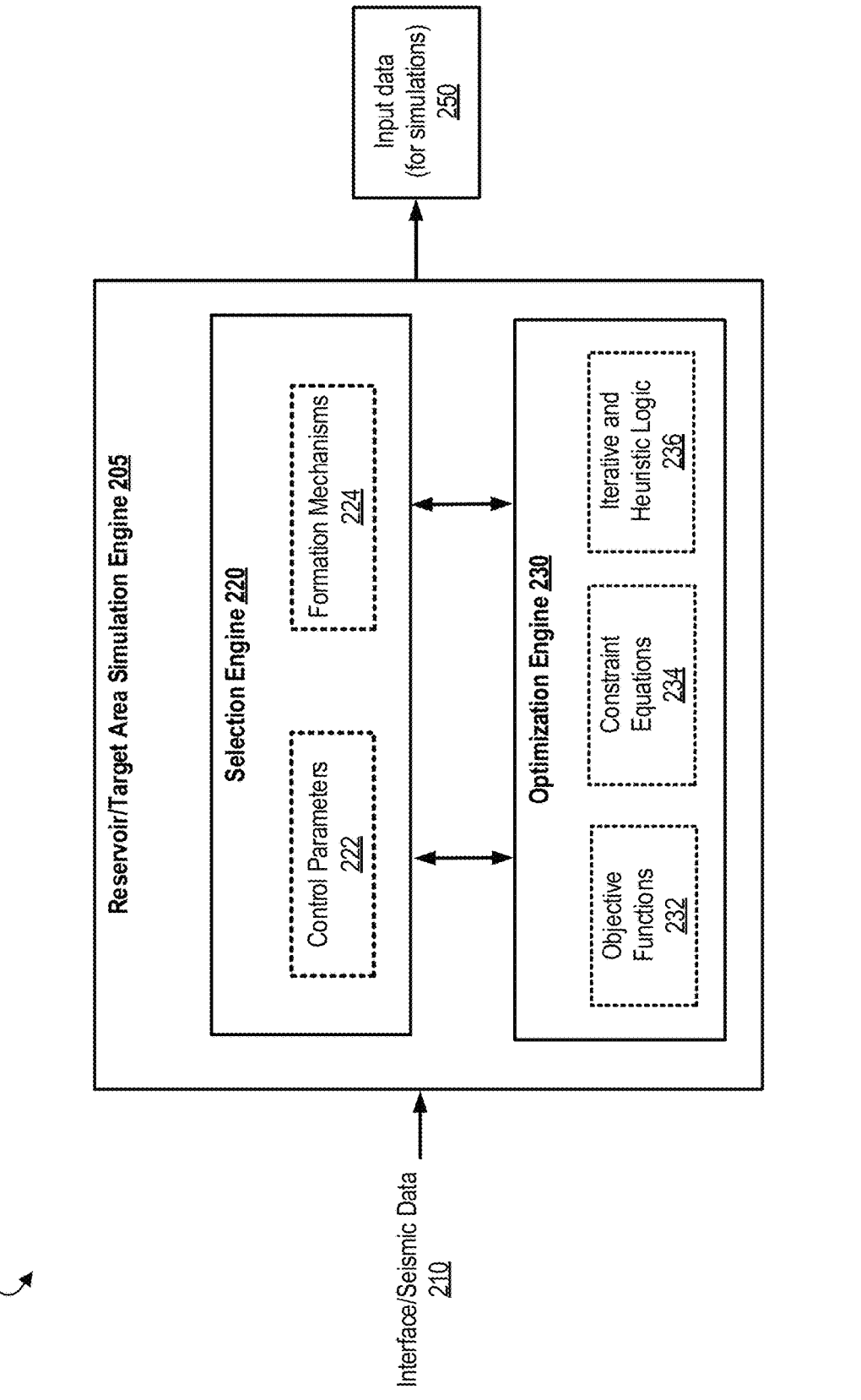
FIG. 2 illustrates an example computing system for generating data used to simulate properties of a target area in a subterranean region.

FIG. 2 illustrates an example computing system 200 that includes a target area simulation engine 205 ("simulation engine 205"). The simulation engine 205 is configured to implement techniques for accurately generating input data 250 used to simulate properties of the target area such as a hydrocarbon reservoir. In some implementations, the generated input data 250 matches, or substantially matches, observed/target values of an interface data 210 that is received as input data to the simulation engine 205. In some other implementations, input data 250 is generated to minimize a delta between observed/target values of interface data 210 and simulated values generated by the simulation engine 205.

The simulation engine 205 may be included in the computer system 124 described earlier with reference to FIG. 1. For example, the simulation engine 205 can be included in the computer system 124 as a sub-system of hardware circuits, such as a special-purpose circuit, that includes one or more processor microchips. Although a single simulation engine 205 is shown in the example of FIG. 2, in some cases the computer systems 124 can include multiple systems 200 or simulation engine 205. Each of the simulation engines 205 can include processors, for example, a central processing unit (CPU) and a graphical processing unit (GPU), memory, and data storage devices.

Referring again to FIG. 2, the simulation engine 205 includes a selection engine 220 and an optimization engine 230. In general, the simulation engine 205 can embody or represent modelling software or an example data model used to process a set of data, which includes information about properties of a subsurface formation, to model or simulate various conditions and properties of a hydrocarbon reservoir or subsurface region. The selection engine 220 is configured to select control parameters 222 for processing the data 210. The selection engine 220 selects the control parameters 222 based on one or more formation mechanisms 224. The formation mechanisms 224 can correspond to a pressure or temperature of the target area. In some implementations, the simulation engine 205 can regularize the data 210 based on a type of input data to be generated and then select one or more control parameters 222 based on regularized data. Each of the control parameters 222 and formation mechanisms 224 are described in more detail later with reference to FIG. 3.

The optimization engine 230 is configured to determine or select objective functions 232 and constraint equations 234. Regarding the objective functions 232, the optimization engine 230 implements an optimization scheme that minimizes outputs of a selected objective function 232. As described earlier, the disclosed techniques treats an appropriate subset of the input data as control parameters and uses optimization to solve for values of the control parameters that minimize an error between information about an observed interface and a simulated interface.

Hence, the simulation engine 205 is configured to select an objective function 232 for the optimization scheme to minimize. For example, the simulation engine 205 determines an objective function for selection from among multiple objective functions that are accessible at the simulation engine 205. The objective functions 232 are configured to measure a mismatch (or delta) between an observed hydrocarbon-water interface and an interface that results from running a reservoir simulator to steady-state for a given value of inferred data. For an example hydrocarbon reservoir containing water and a single hydrocarbon phase, one choice is the $L_2$ norm of the difference between observed water saturations obtained via the data 210 and simulated water saturations model by system 200. This objective function 232 is shown as equation (1):

$$J = \int_{\Omega_{res}} \left( S_w - S_w^{obs} \right)^2 d\Omega \tag{1}$$

where J is the objective function, $\Omega_{res}$ is the domain, $S_w$ is the simulated water saturation, and $$S_w^{obs}$$

is the observed water saturation.

For a reservoir with more than two fluid phases, equation (1) can be generalized to:

$$J = \int_{\Omega_{res}} \sum_{\alpha=1}^{N_p-1} \left(S_\alpha - S_\alpha^{obs}\right)^2 d\Omega \qquad (2)$$

where $N_p$ is the number of phases and a is a phase index (e.g., $\alpha=1$ might correspond to the water phase). In addition to saturation-based objective functions, the system 200 can use pressure-based objective functions. For example, as shown at equation (3) an objective function can be expressed as the $L_2$ norm of the difference between the simulated pressures and the true pressures in the hydrocarbon phase:

$$J = \int_{\Omega_o} \left(p_{HC} - p_{HC}^{obs}\right)^2 d\Omega, \qquad (3)$$

where $\Omega_{HC}$ is the part of the domain containing the hydrocarbon phase, $p_{HC}$ is the simulated hydrocarbon pressure, and $$p_{HC}^{obs}$$

is the observed hydrocarbon pressure. While the pressures in the hydrocarbon phase are likely unknown in practice, they can be inferred given a reference pressure in the hydrocarbon phase if the hydrocarbon velocities are zero or negligibly small. Compared to a saturation-based objective function, a pressure-based objective function such as equation (3) can be advantageous because it enables the governing PDEs that constrain the optimization to be simplified to a single steady-state equation. This simplification lowers the computational cost of solving the governing equations, which in turn reduces the time required to implement the disclosed techniques for generating the input data.

Regarding the constraint equations 234, the optimization engine 230 implements an optimization scheme that selects one or more constraint equations 234 that are used to solve for values of the control parameters 222. In some implementations, an example arithmetic or computational program is solved to determine optimal values of the control parameters. The example program can be subject to two different classes of constraints: i) constraints introduced by a governing equation and ii) constraints introduced to ensure that a reservoir state remains physically plausible.

The constraint equations 234 represent governing equations that constrain a steady-state of a target area according to a set of physical laws. These laws are expressed as a system of partial differential equations (PDEs) describing a flow of mass, momentum, and energy through a target area domain such as reservoir domain $\Omega_{res}$. The mass conservation equation for each chemical component is:

$$\frac{\partial}{\partial t} \sum_{\alpha=w}^g \phi x_{i\alpha} \xi_\alpha S_\alpha + \nabla \cdot \sum_{\alpha=w}^g x_{i\alpha} \xi_\alpha u_\alpha = 0, \; i = 1,2, \ldots , N_c. \qquad (4)$$

$\xi_\alpha$ is the molar density of phase $\alpha$, which can be computed as:

$$\xi_\alpha = \sum_{i=1}^{N_c} \xi_{i\alpha}, \qquad (5)$$

where $N_c$ is the number of chemical components and $\xi_{i\alpha}$ is the molar density of component i in phase $\alpha$, and $\alpha=o, w, g$. $x_{i\alpha}$ is the mole fraction of component i in phase $\alpha$, i.e. $x_{i\alpha}=\xi_{i\alpha}/\xi_\alpha$. The volumetric phase velocities $u_\alpha$ are given by Darcy's law:

$$u_\alpha = -\frac{k_{r\alpha}}{\mu_\alpha} k(\nabla p_\alpha - \rho_\alpha g \nabla z), \qquad (6)$$

where $k_{r\alpha}$ is the relative permeability of phase $\alpha$, $\mu_\alpha$ is the viscosity of phase $\alpha$, k is the permeability of the porous medium, $p_\alpha$ is the pressure of phase $\alpha$, $\rho_\alpha$ is the mass density of phase $\alpha$, and g is the magnitude of the gravitational acceleration.

The energy conservation equation is:

$$\frac{\partial}{\partial t}\left(\phi \sum_{\alpha=w}^g \rho_\alpha S_\alpha U_\alpha + (1-\phi)\rho_s C_s T\right) + \nabla \cdot \sum_{\alpha=w}^g \rho_\alpha u_\alpha H_\alpha - \nabla \cdot (k_T \nabla T) = q_L, \qquad (7)$$

where T is the temperature, $U_\alpha$ is the specific internal energy of phase $\alpha$, $H_\alpha$ is the specific enthalpy of phase $\alpha$, $\rho_s$ is the density of the solid, $C_s$ is the specific heat of the solid, $k_T$ is the total thermal conductivity, and $q_L$ is the heat loss to the overburden and underburden. The specific internal energy and specific enthalpy can be computed from the temperature:

$$U_\alpha = C_{V\alpha} T, \qquad (8)$$

$$H_\alpha = C_{p\alpha} T, \qquad (9)$$

where $C_{V\alpha}$ and $C_{p\alpha}$ are the specific heat capacities at constant volume and pressure, respectively.

Additional algebraic equations are required to close the system of differential equations, namely mole fraction balance:

$$\sum_{i=1}^{N_c} x_{i\alpha} = 1, \; \alpha = w,o,g \qquad (10)$$

a saturation constraint:

$$S_w + S_o + S_g = 1, \qquad (11)$$

and the phase pressure/capillary pressure relations:

$$p_{cow} = p_o - p_w, p_{cgo} = p_g - p_o. \qquad (12)$$

In addition to these relations, equations of state are included to determine the distribution of chemical components amongst the phases. In some cases, pressure-volume-temperature (PVT) relations are provided to compute the fluid properties, as well as relations to compute the porosity, relative permeability, and capillary pressures.

The simulation engine 205 can use a number of approaches to perform its data optimizations for determining solutions to the arithmetic or computational programs described previously. For example, some (or all) of the approaches can fit into two categories: iterative and heuristic. Hence, the simulation engine 205 includes compute logic 236 for implementing its optimization scheme based on an iterative or heuristic approach, each of which are described in more detail later with reference to FIG. 3.

FIG. 3 shows an example process 300 for generating data used to simulate properties of a target area in a subterranean region. More specifically, process 300 provides an improved approach to inferring and generating required input data for use in simulating geological properties at a water-hydrocarbon interface of a hydrocarbon reservoir in a subsurface formation.

Process 300 can be implemented or executed using the computer systems 124 and the simulation engine 205 of a system 200. Hence, descriptions of process 300 may reference the computing resources of computer systems 124 and the simulation engine 205 described earlier in this document. In some implementations, the steps or actions included in process 300 are enabled by programmed firmware or software instructions, which are executable by one or more processors of the devices and resources described in this document.

Referring now to process 300, the simulation engine 205 obtains data describing a water-hydrocarbon interface of a target area (302). Data about the water-hydrocarbon interface may be obtained as a first step of generating data used to simulate properties of the target area. In some implementations, the target area in the subterranean region is a hydrocarbon reservoir. In some other implementations, the target area is another area of a subsurface formation that differs from, or that borders, the hydrocarbon reservoir. The obtained data describes a topology of the water-hydrocarbon interface prior to injection of fluids from the hydrocarbon reservoir or production of fluids from the hydrocarbon reservoir.

The water-hydrocarbon interface may, or may not, exhibit spatially-varying depths. For example, the water-hydrocarbon interface can include a steady-state depth or a spatially varying depth. In some cases, the water-hydrocarbon interface includes a spatially varying depth that is judged to be at steady-state. In these cases, (or interface) data will be used as a target. As described in more detail later, the simulation engine 205 calculate values of an appropriate set of control parameters that result in the smallest delta between observed (interface data) and simulated values, including values that produce simulation results that match (or substantially match) the interface data, or quantities derived from it. The interface data can take several forms. For example, the interface data can be the fluid saturations in every node or cell in an example computational reservoir model. The interface data can also be a map of the depths to the interface.

The simulation engine 205 selects control parameters 222 for processing the data (304). In some implementations, the control parameters are selected based on the formation mechanism believed to be responsible for generating a tilted water-hydrocarbon interface. The simulation engine 205 may also select the control parameters 222 based on a formation mechanism corresponding to a pressure or temperature of the target area. Several mechanisms 224 can affect the topology of the water-hydrocarbon interface, including spatially varying capillarity, spatially varying hydrodynamic pressures, and spatially varying fluid densities, perhaps caused by spatially varying reservoir temperatures. In some implementations, the simulation engine 205 selects one or more of these mechanisms 224 as a first step in generating the input data. The simulation engine 205 can automatically infer a selection of mechanisms 224, for example, based on data values of the data 210, determine a selection of mechanisms 224 based on user input, or both. The selection of the formation mechanism 224 impacts selection of the control parameters 222 as well as selection of optimization constraints 234, which are described later with reference to step 308. In some implementations, the simulation engine 205 relies upon expert knowledge of the particular mechanisms present in a given reservoir to determine a selection of a particular mechanism 224.

In some implementations, selection of the mechanisms 224 is guided by reservoir-specific field data that suggest which mechanisms are dominant. In some other implementations, selection of the mechanisms 224 is influenced by a desire to simplify the analysis performed by the simulation engine 205. For example, application of techniques for generating the input data can be simplified for cases with a single mechanism, but becomes more complex for cases with multiple mechanisms.

Referring again to the control parameters, the simulation engine 205 is configured to determine which control parameters 222 are to be selected for a given processing/optimization sequence. As noted earlier, the simulation engine 205 determines the control parameters based, in part, on the choice of mechanisms 224. In some implementations, the control parameters include, or correspond to, one or more of capillary pressure curves, pressure-related boundary conditions of the target area, and temperature-related boundary conditions of the target area.

For example, if the mechanism 224 of interest is the spatially varying capillarity, then the simulation engine 205 can choose control parameters defining capillary pressure curves at each node or cell in a computational model of the target area, e.g., a reservoir. If the mechanism 224 of interest are spatially varying densities due to spatially varying temperatures, then the simulation engine 205 can choose static temperatures in each grid cell corresponding to a model output. Alternatively, the simulation engine 205 can identify and select temperature-related boundary conditions along top and bottom boundaries of target area or hydrocarbon reservoir. If the mechanism 224 of interest is spatially varying hydrodynamic pressures, then the simulation engine 205 can choose fluid pressures on lateral boundaries of the reservoir model.

The choice of control parameters 222 could also be influenced by the features available in a dataset for an example reservoir simulator. For example, if the selected mechanism 224 is spatially varying hydrodynamic pressures and the simulator does not allow for modification of the boundary fluid pressures, then the simulation engine 205 can be configured to choose fluid pressures in nodes or cells adjacent to the boundaries. If the example simulator does not allow this, then the simulation engine 205 can be configured to include fictitious wells near the boundaries and to choose those well pressures as control parameters.

Selection of the control parameters 222 can also be impacted by a desire to regularize the data 210. For example, if the data to infer are fluid pressures on lateral boundaries of a reservoir model, the simulation engine 205 can regularize the data using a vertical equilibrium approximation. This approximation constrains the pressures to vary hydrostatically in each vertical column. Under this constraint, the control parameters would not consist of all boundary pressures, but rather only one reference pressure in each vertical column of the boundary since all other pressures could be calculated given the reference pressure. This choice could lead to more physically plausible solutions, and would also likely decrease the compute time required to run the disclosed data simulation techniques.

The simulation engine 205 determines an objective function 232 that measures a delta between first values observed in the data and second values from simulations of the target area (306). In some implementations, this delta represents a difference in the observed steady-state saturations or water-hydrocarbon interface surface. As described earlier, for an example hydrocarbon reservoir containing water and a single hydrocarbon phase, the simulation engine 205 can select an objective function that is the $L_2$ norm of the difference between observed water saturations obtained via the data 210 and simulated water saturations model by system 200. This objective function 232 is shown as equation (1):

$$J = \int_{\Omega_{res}} \left(S_w - S_w^{obs}\right)^2 d\Omega.$$

The simulation engine 205 calculates values for each of the control parameters that result in the smallest delta between observed and simulated values based on an output of the objective function (308). For example, the simulation engine 205 calculates values for each of the control parameters that minimizes the delta between the first values observed in the interface data and the second values from simulations of the target area. Calculating values for each of the control parameters can include: i) identifying an equation that constrains data optimization to a steady-state of the target area; ii) determining a respective value for a boundary condition and an initial condition of the target area; and iii) solving the equation using the respective values for the boundary condition and initial condition. In some implementations, the arithmetic program that is solved to determine the optimal values of the control parameters is subject to two different classes of constraints: i) the constraints introduced by the governing equations and ii) the constraints introduced to ensure that the reservoir state remains physically plausible.

Solving the governing equations can require determination or specifying of boundary and initial conditions. The simulation engine 205 can determine boundary conditions that specify the pressure, composition, temperature, flow of mass, or flow of energy through each domain boundary. In some cases, the values of boundary states that are chosen as control parameters will be controlled by an optimizer, such as optimization engine 230. In some implementations, any remaining boundary conditions are specified explicitly by an example data modeler of systems 124, 200. The initial condition of the reservoir should be chosen to reflect a physically plausible reservoir state.

The governing equations that constrain the optimization can be used in different forms. For example, one form is the transient, multi-component version shown in equation (4). When used in this form, the steady-state of the reservoir (or target area) is determined by evolving one or more flow equations forward in time until the time derivatives of mass and energy are zero or below a given threshold. When the flow equations are evolved forward, residual hydrocarbon saturations may be left in regions of the reservoir where hydrocarbon is displaced by water, thereby reducing the estimate of reserves in the contiguous body of hydrocarbon. To avoid this behavior, the relative permeability curves can be modified such that the residual saturation of hydrocarbon is zero.

In some implementations, to mitigate the computational expense of solving the governing equations, the simulation engine 205 can be configured to use simplified forms of one or more equations. One type of simplification is to reduce the number of mass balance equations. If transient equations are used, then chemical components can be lumped into pseudo-components, which would reduce the number of equations from the number of components to the number of pseudo-components. In this way, a reduced compositional model or black-oil model could be used to constrain the optimization. Where possible, however, the governing equations can be used to derive a pressure equation, which reduces the number of mass balance equations from the number of components to one. Another type of simplification is removing the accumulation term from one or more equations, making the system steady state. This simplification avoids the computational cost of solving the equations forward in time. The combination of these two simplifications leads to a steady-state pressure equation that can provide improved efficiency relative to non-simplified equations.

In some implementations, one or more plausibility constraints are added to ensure that the state of the reservoir remains physically plausible and matches or substantially matches observation data. For example, an engineers can incorporate domain knowledge to specify bounds on pressures, temperatures, fluid velocities and heat fluxes within the reservoir. These bounds can be incorporated into the arithmetic program as inequality constraints. Observation wells that have been drilled through the reservoir provide values of pressure and temperature at known locations. These known values can be incorporated into the arithmetic program as equality constraints.

The simulation engine 205 generates input data to simulate properties of the target area based on the values for each of the control parameters that minimizes the delta between the first values observed in the data and the second values from simulations of the target area (310). As described earlier, the simulation engine 205 includes compute logic 236 for implementing its optimization scheme based on iterative computational approaches, heuristic computational approaches, or a combination of both. The simulation engine 205 generates the input data 250 based at least on the different approaches that may be used to implement its optimization scheme.

Iterative approaches converge to an optimal solution and typically incorporate information about the sensitivity of the objective function 232 to the control parameters 222, i.e., gradient information, to compute progressively better approximations to the optimal solution. Hence, calculating values for the control parameters 222 can include calculating values that produce a particular simulation result, e.g., smallest delta between observed and simulated values, based on an iterative optimization approach of the simulation engine 205. Heuristic computational approaches are typically based on random sampling of the control parameters 222 until an acceptable solution is found. In some implementations, iterative computational approaches are guaranteed to converge to an optimal solution, whereas heuristic methods are not guaranteed to converge to a solution, but nonetheless may provide an acceptable approximate solution.

The simulation engine 205 can be configured to use an iterative method that incorporates gradient information to solve the arithmetic program discussed earlier. In some cases, quasi-Newton methods can be used, whereas in other cases sequential least squares quadratic programming (SLSQP) can also be used. For example, the SLSQP can be used when additional constraints beyond the governing equations are introduced.

Computing the gradient of the objective function 232 with respect to the control parameters 222 can be efficiently performed by solving an adjoint system of equations. The adjoint equations can be derived by linearizing the selected objective function 232 and governing equations, and introducing a set of Lagrange multipliers that represent the linear sensitivity of the objective function with respect to perturbations in the residuals of the governing equations. The gradient of the objective function can be computed by solving for these Lagrange multipliers and taking their inner product with the derivative of the residuals of the governing equations with respect to the control variables.

In some implementations, the simulation engine 205 can determine or provide initial estimates of optimal control parameter values that close to a desired target value, which can reduce a number of steps required to converge to an optimal solution for an iterative optimization sequence of the simulation engine 205. For reservoirs where hydrodynamic forces are the primary mechanism that produce a variable fluid contact surface, an approximate estimate of the pressure gradient can be computed using the following equation:

$$\frac{\partial p}{\partial s} = \frac{\rho_w - \rho_h}{g} \tan \theta, \qquad (13)$$

where s is the distance in the direction of the fluid contact interface tilt, $\rho_w$ is the water density, $\rho_h$ is the hydrocarbon density, g is the acceleration due to gravity, and $\theta$ is the angle of the fluid contact interface tilt, which can be estimated by fitting a plane to the fluid contact interface. The pressure gradient and value of the pressure at a specified location can then be used to determine an initial estimate for the pressures on the lateral reservoir boundaries.

Figure 4:
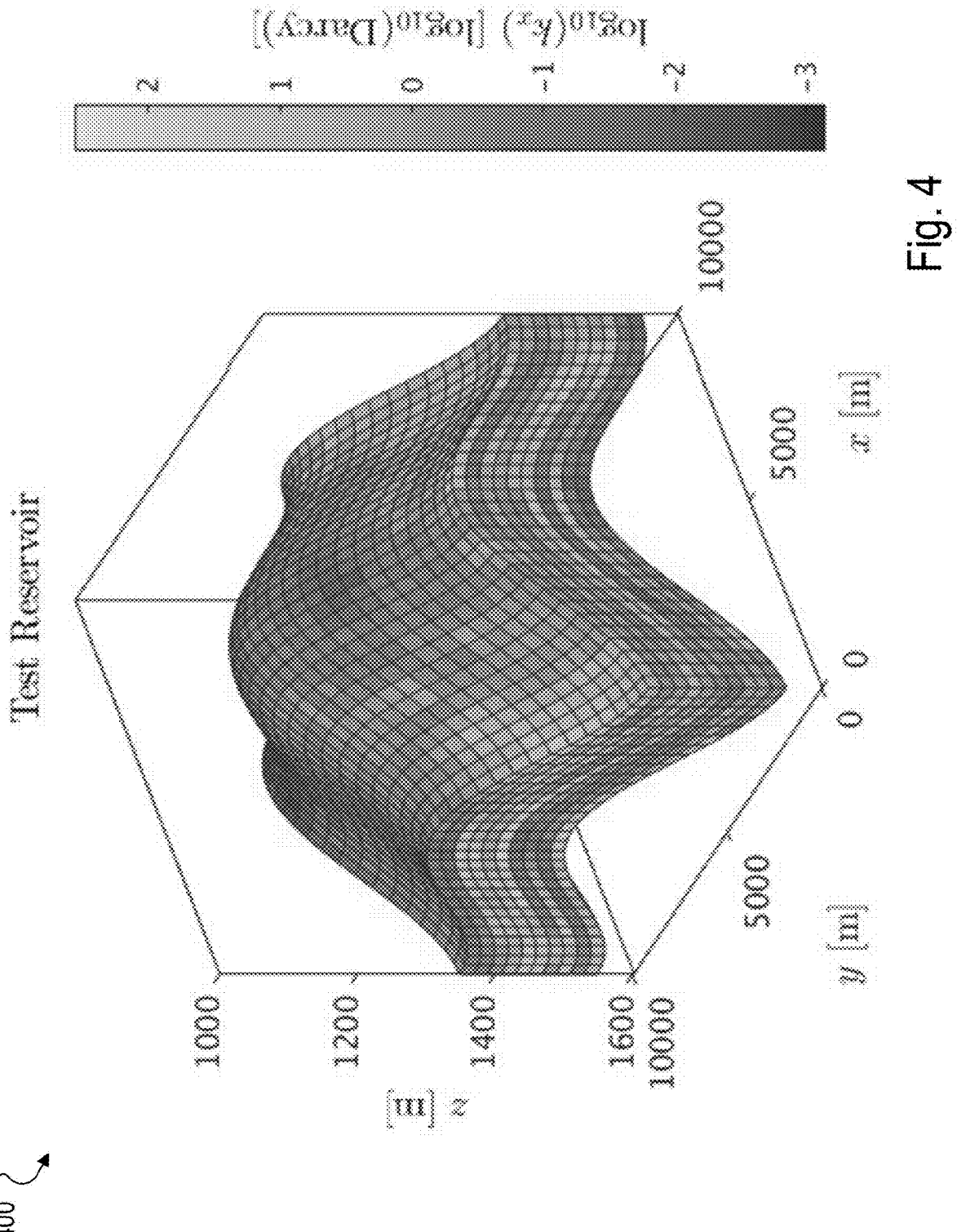
FIG. 4 illustrates an example of a target area in a subterranean region.
Figure 5:
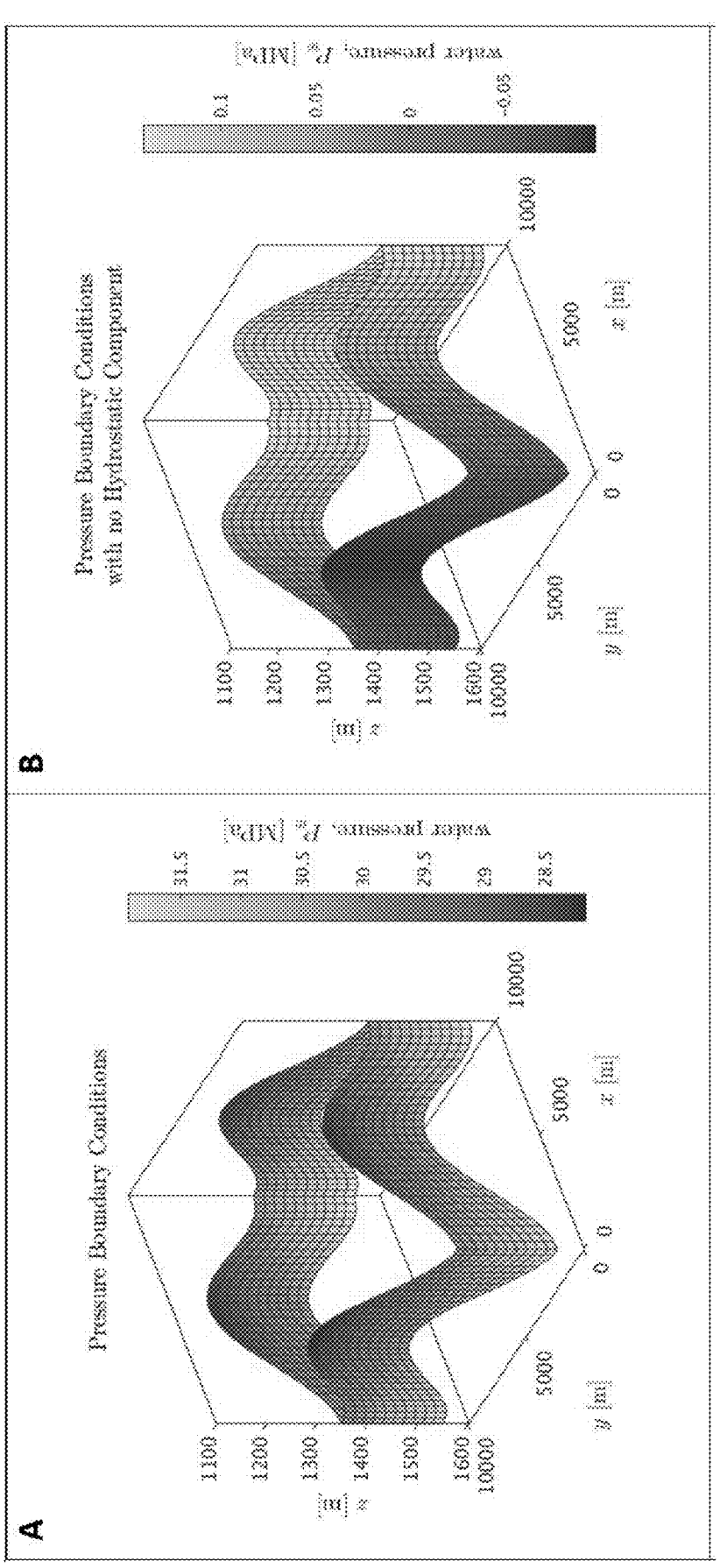
FIG. 5 shows example illustrations of different boundary conditions.

FIG. 4 illustrates an example of a target area 400 in a subterranean region. In the example of FIG. 4, the target area is an oil-water reservoir with a single dome and heterogeneous rock properties. The example illustration of target area 400 shows the distribution of the x-component of the permeability, $k_x$. FIG. 5 shows example illustrations of different boundary conditions. In the example of FIG. 5 it is assumed that the tilt in the oil-water contact was due only to hydrodynamic forces. To generate these forces in the hydrocarbon reservoir, the system 200 assigns Dirichlet pressure boundary conditions to the lateral boundaries. The pressures are varied hydrostatically in the vertical direction as shown in illustration (A) and non-uniformly in the lateral directions. To emphasize the lateral variations, illustration (B) shows the pressures with the hydrostatic component removed.

Figure 6:
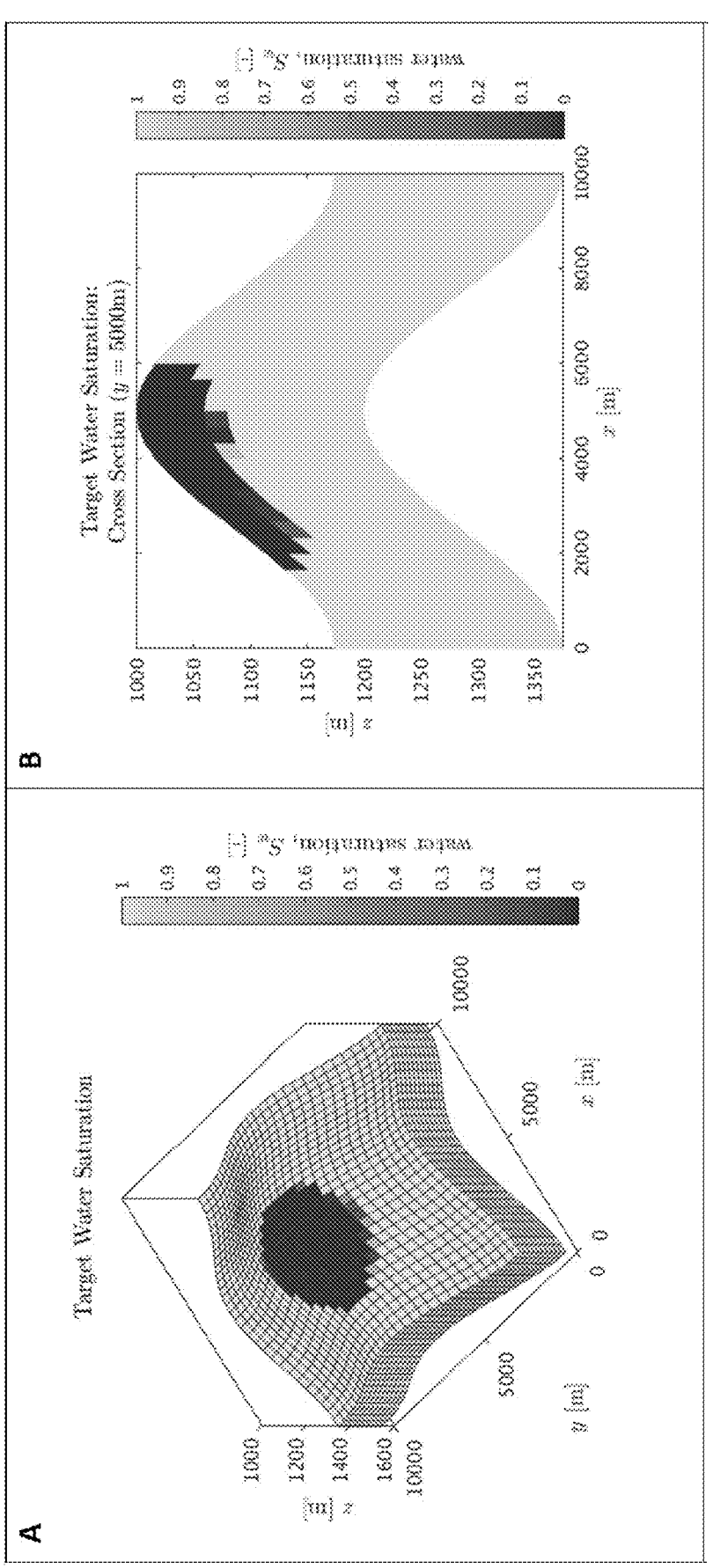
FIG. 6 shows example illustrations corresponding to water saturation fields.

FIG. 6 shows example illustrations corresponding to water saturation fields. In the example of FIG. 6, the pressure boundary conditions shown in the example of FIG. 5 produced a water saturation field (A) in which the oil-water contact exhibited a tilt (B). In some implementations, the system 200 is configured to infer pressure boundary conditions that would reproduce this saturation field.

Figure 7:
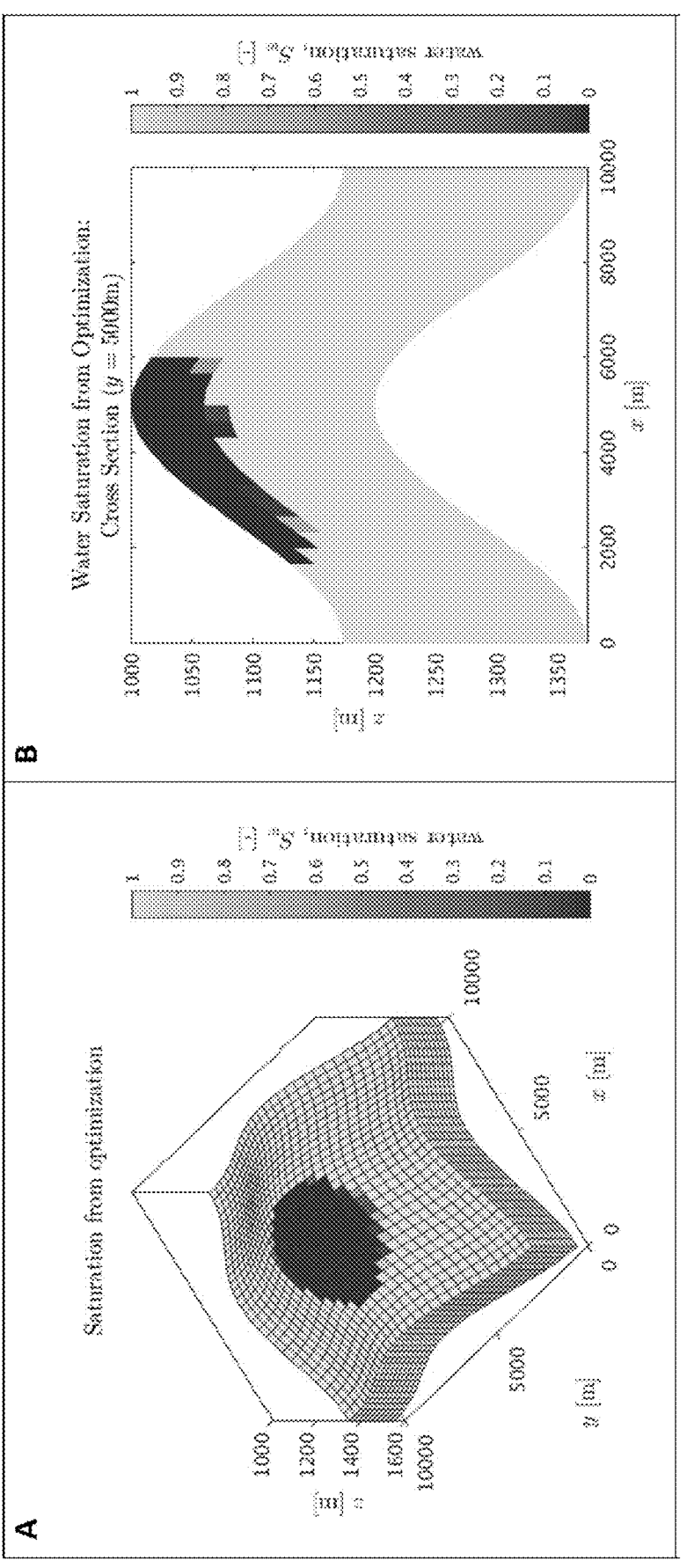
FIG. 7 shows example illustrations indicating solutions for control parameters for simulating the target water saturation fields of FIG. 6.

FIG. 7 shows example illustrations indicating solutions for control parameters for simulating the target water saturation fields of FIG. 6. More specifically, in the example of FIG. 7, the system 200 determines solutions for lateral boundary pressures that would reproduce the target water saturation field shown in the example of FIG. 6. Using the new boundary pressures, the simulation engine 200 obtains the saturation field shown in this figure. The obtained saturation field of FIG. 7 agrees well with the target saturation field.

Figure 8:
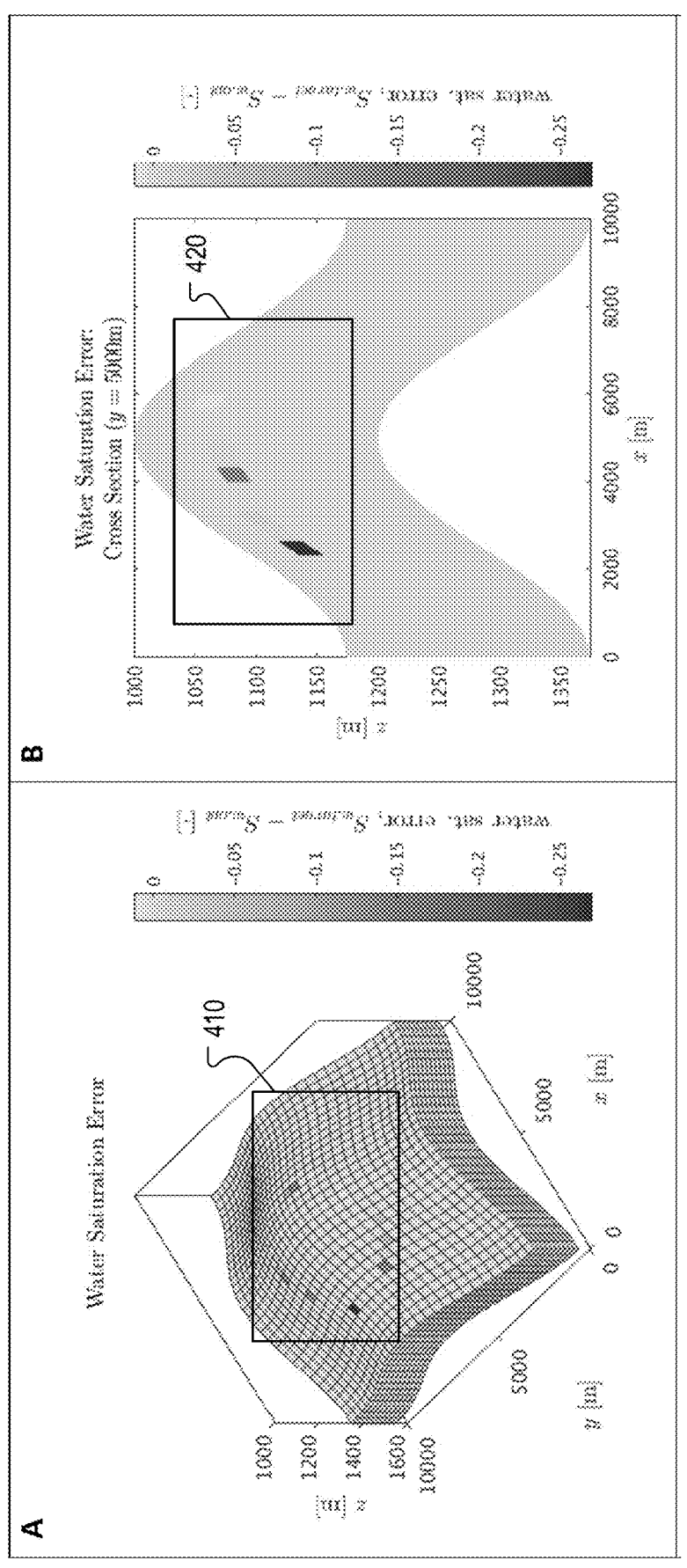
FIG. 8 shows example illustrations indicating water saturation errors.
Figure 9:
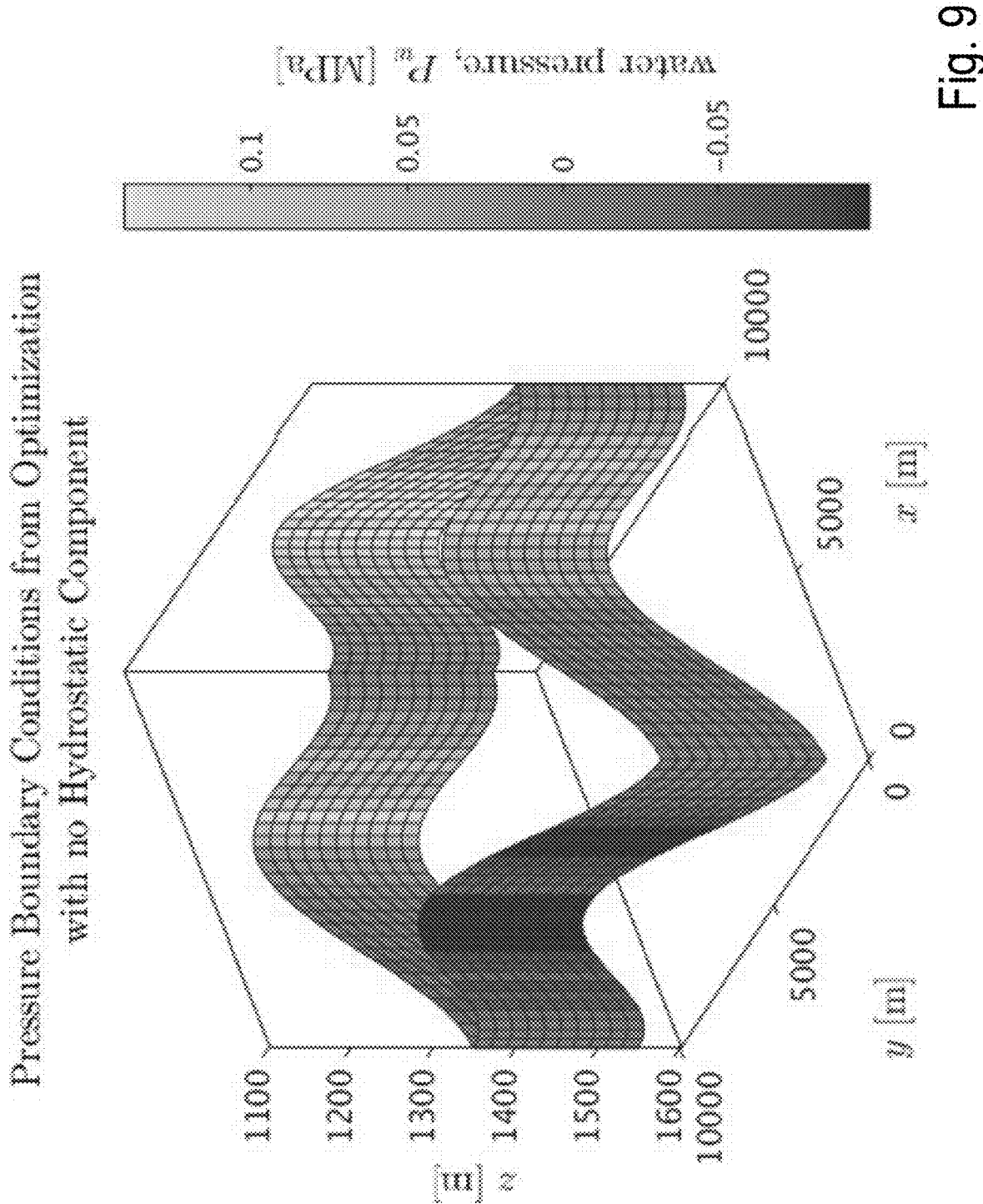
FIG. 9 shows example illustrations indicating pressure boundary conditions.

FIG. 8 shows example illustrations indicating water saturation errors. In the example of FIG. 8, differences between the target saturation field and the saturation field determined based on the disclosed techniques occur in some of the cells at the oil-water interface. FIG. 9 shows example illustrations indicating pressure boundary conditions. In the example of FIG. 9, the pressure boundary conditions determined based on the disclosed techniques exhibit similar trends to the boundary conditions that produced the target saturation field of FIG. 5, illustration B. For example, both have higher pressures on the right side of the model and lower pressures on the left side. The pressures determined based on the disclosed techniques, however, do not vary as smoothly. If desired, this difference in smoothness can be mitigated by imposing further regularizations.

To evaluate or implement the disclosed techniques, a prototype can be developed using an example computing program, such as the MATLAB Reservoir Simulation Toolbox (MRST) or related simulation resources. In some implementations, source code for the computing program can be supplemented with one or more additions. For example, a first addition can include a library for nonlinear optimization (e.g., NLopt). A second addition can include program code or instructions to calculate an objective function, equation (3), and sensitivity gradients required by NLopt. A third addition can include program code or instructions to create a synthetic oil reservoir for testing the optimization procedure.

An example test reservoir (e.g., the synthetic oil reservoir) can exhibit a single oil dome. The porosity may be heterogeneous, whereas the permeability maybe heterogeneous and anisotropic. In this example, the permeability tensor contained no off-diagonal components. An example relating to this is illustrated at FIG. 4. The reservoir contains only oil and water, which were immiscible and compressible.

In general, the evaluation includes generating data for use in simulating a reservoir with a tilted oil-water interface: the oil saturation field. The test reservoir may be assigned Dirichlet boundary conditions for water pressure along the lateral boundaries. The pressures may be varied hydrostatically in the vertical direction, but exhibit lateral variations that produce a regional hydrodynamic pressure gradient across the reservoir that tilts the oil-water interface. An example relating to this is illustrated at FIG. 5. The top and bottom boundaries can be no-flow boundaries. For simplicity, other mechanisms that influence the tilt can be neglected, such as regionally varying capillary pressures and varying fluid densities that could result from a non-uniform reservoir temperature. A forward simulation with these boundary conditions can be performed until the system reaches steady state. Data or information relating to the saturation field (see, for example, FIG. 6) may then be saved.

A test may be performed as part of the evaluation. To perform the test, the boundary conditions are replaced with conditions that would not create any tilt, and then the system 200 is used to solve for new boundary conditions that would create the saturation field saved in the previous step. The single multiphase-phase pressure equation of the governing/constraint equations 234 described earlier and an objective function based on the hydrostatic pressure in the oil phase only, equation (3), can be used to implement the optimization procedure. The boundary conditions are regularized by requiring that the pressures be hydrostatic in each vertical column of boundary faces.

After performing the test, a forward simulation can be ran with the optimized boundary conditions until the system reaches steady state. The resulting oil saturation field is compared with the true oil saturation field. At least one result of the comparison will indicate that the resulting oil saturation field matches, or is substantially similar to, the true oil saturation field (see FIGS. 7 and 8). The inferred boundary conditions may also be compared. At least one result of this comparison will indicate that the inferred boundary pressures determined using the disclosed techniques exhibit the same broad trends as the non-inferred (true) boundary pressures. In some implementations, the inferred boundary conditions do not vary as smoothly (see FIG. 9).

Some results from the test can show that the disclosed techniques for generating input data can be used to calculate values of water pressure on the reservoir boundaries that closely reproduce observed tilts in the hydrocarbon-water interface, but that do not necessarily agree with the true boundary pressures. This disagreement can be improved by imposing further regularizations on the boundary pressures, or by constraining some of the boundary pressures with field measurements. In some cases, the disagreement provides acceptable results, particularly since the true boundary conditions are often unavailable, and since many different boundary conditions could produce the same observed tilt.

Figure 10:
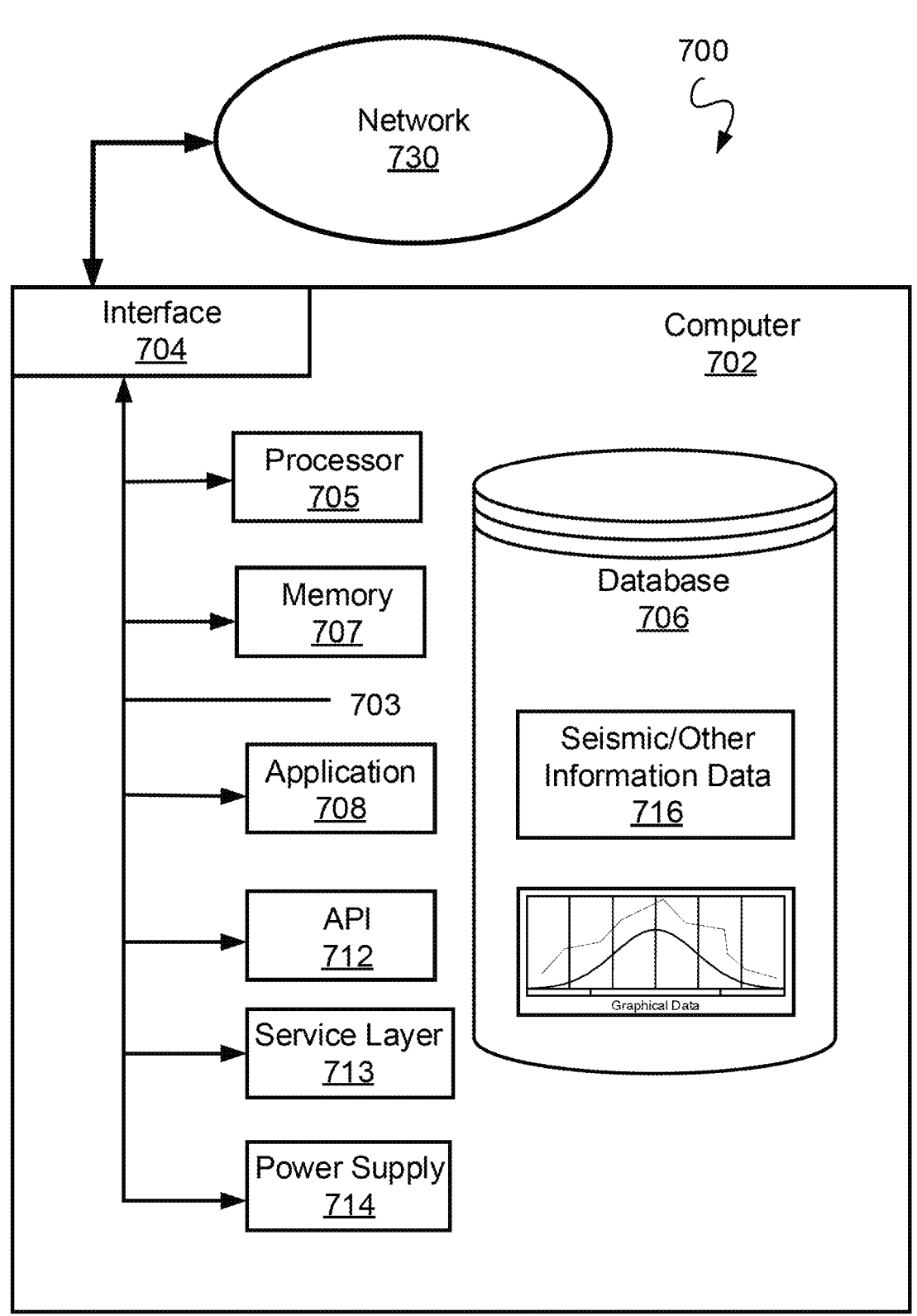
FIG. 10 is a block diagram illustrating an example computer system used to provide computational functionalities associated with described algorithms, methods, functions, processes, flows, and procedures according to some implementations of the present disclosure.

FIG. 10 is a block diagram of an example computer system 700 used to provide computational functionalities associated with described algorithms, methods, functions, processes, flows, and procedures described in the present disclosure, according to some implementations of the present disclosure.

The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

Generally, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data, including data 716 (for example, data described earlier at least with reference to FIG. 1), for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method for generating data used to simulate properties of a target area in a subterranean region, the method comprising:
   controlling a data acquisition system for obtaining data characterizing a water-hydrocarbon interface of the target area;

determining control parameters for processing the data, based on a formation mechanism involved in generating the water-hydrocarbon interface;

determining by the simulation engine, an objective function that measures a delta between first values observed in the data and second values from simulations of the target area;

based on an output of the objective function, calculating, by the simulation engine, values for each of the control parameters that minimizes the delta between the first values observed in the data and the second values from simulations of the target area, wherein calculating values for each of the control parameters comprises:
   identifying a steady-state pressure equation that constrains data optimization to a steady-state of the target area by removing accumulation terms from the steady-state pressure equation;
   determining a respective value for a boundary condition and an initial condition of the target area; and
   solving the steady-state pressure equation using the respective values for the boundary condition and initial condition;

generating, by the simulation engine, input data to simulate properties of the target area based on the values for each of the control parameters that minimizes the delta between the first values observed in the data and the second values from simulations of the target area;

performing a simulation of a target water saturation field in accordance with the selected control parameters and generated input data; and controlling drilling operations based on an outcome of the simulation of the target water saturation field.

2. The method of claim 1, further comprising:
performing inference computations to obtain a dataset for a steady-state simulation, wherein the dataset comprises delta measurements of the objective function; and based on the delta measurements, performing iterative optimization to minimize a delta between a first value observed in the data and a second value from the particular simulation of the target area.

3. The method of claim 2, wherein calculating values for each of the control parameters comprises:
calculating values for each of the control parameters that produce a particular simulation result corresponding to a smallest delta between observed interface data and simulated data, based on the iterative optimization.

4. The method of claim 1, further comprising:
regularizing the data based on a type of input data to be generated; and
selecting one or more of the control parameters based on regularized data.

5. The method of claim 1, wherein selecting the control parameters comprises:
   determining a plurality of formation mechanisms that affect a topology of the water-hydrocarbon interface;
   selecting, from the plurality of formation mechanisms, a set of formation mechanisms to model properties of the water-hydrocarbon interface; and
   selecting the control parameters based on the set of mechanisms.

6. The method of claim 5, wherein the set of formation mechanisms comprises one or more of:
   spatially varying capillarities,
   spatially varying hydrodynamic pressures,
   spatially varying fluid densities; and
   spatially varying temperatures.

7. The method of claim 1, wherein the control parameters correspond to one or more of:

capillary pressure curves, pressure-related boundary conditions of the target area, and temperature-related boundary conditions of the target area.

8. The method of claim 1, wherein the water-hydrocarbon interface has a spatially varying depth.

9. The method of claim 8, wherein the water-hydrocarbon interface has a spatially varying depth at steady-state.

10. The method of claim 1, wherein:

the target area in the subterranean region is a hydrocarbon reservoir; and the data describes a topology of the water-hydrocarbon interface prior to injection of fluids from the hydrocarbon reservoir or production of fluids from the hydrocarbon reservoir.

11. A system for generating data used to simulate properties of a target area in a subterranean region, the system comprising a processing device and a non-transitory machine-readable storage device storing instructions that are executable by the processing device to cause performance of operations comprising:

controlling a data acquisition system for obtaining data characterizing a water-hydrocarbon interface of the target area;

determining control parameters for processing the data, based on a formation mechanism involved in generating the water-hydrocarbon interface;

determining by the simulation engine, an objective function that measures a delta between first values observed in the data and second values from simulations of the target area;

based on an output of the objective function, calculating, by the simulation engine, values for each of the control parameters that minimizes the delta between the first values observed in the data and the second values from simulations of the target area, wherein calculating values for each of the control parameters comprises:

identifying a steady-state pressure equation that constrains data optimization to a steady-state of the target area by removing accumulation terms from the steady-state pressure equation;

determining a respective value for a boundary condition and an initial condition of the target area; and solving the steady-state pressure equation using the respective values for the boundary condition and initial condition;

generating, by the simulation engine, input data to simulate properties of the target area based on the values for each of the control parameters that minimizes the delta between the first values observed in the data and the second values from simulations of the target area;

performing a simulation of a target water saturation field in accordance with the selected control parameters and generated input data; and controlling drilling operations based on an outcome of the simulation of the target water saturation field.

12. The system of claim 11, further comprising:

performing inference computations to obtain a dataset for a steady-state simulation, wherein the dataset comprises delta measurements of the objective function; and based on the delta measurements, performing iterative optimization to minimize a delta between a first value observed in the data and a second value from the particular simulation of the target area.

13. The system of claim 12, wherein calculating values for each of the control parameters comprises:

calculating values for each of the control parameters that produce a particular simulation result corresponding to a smallest delta between observed interface data and simulated data, based on the iterative optimization.

14. The system of claim 11, further comprising:

regularizing the data based on a type of input data to be generated; and selecting one or more of the control parameters based on regularized data.

15. The system of claim 11, wherein selecting the control parameters comprises:

determining a plurality of formation mechanisms that affect a topology of the water-hydrocarbon interface;

selecting, from the plurality of formation mechanisms, a set of formation mechanisms to model properties of the water-hydrocarbon interface; and selecting the control parameters based on the set of mechanisms.

16. The system of claim 15, wherein the set of formation mechanisms comprises one or more of:

spatially varying capillarities, spatially varying hydrodynamic pressures, spatially varying fluid densities; and spatially varying temperatures.

17. The system of claim 16, wherein the control parameters correspond to one or more of:

capillary pressure curves, pressure-related boundary conditions of the target area, and temperature-related boundary conditions of the target area.

* * * * *